(12) United States Patent
DeMenthon

(10) Patent No.: US 7,542,072 B2
(45) Date of Patent: Jun. 2, 2009

(54) DEVICE USING A CAMERA AND LIGHT POLARIZATION FOR THE REMOTE DISPLACEMENT OF A CURSOR ON A DISPLAY

(75) Inventor: Daniel DeMenthon, Clarksville, MD (US)

(73) Assignee: The University of Maryland, Riverdale, MD (US)

( * ) Notice: Subject to any disclaimer, the term of this patent is extended or adjusted under 35 U.S.C. 154(b) by 481 days.

(21) Appl. No.: 11/189,377

(22) Filed: Jul. 26, 2005

(65) Prior Publication Data

US 2006/0023111 A1 Feb. 2, 2006

Related U.S. Application Data

(60) Provisional application No. 60/591,892, filed on Jul. 28, 2004.

(51) Int. Cl.
*H04N 5/225* (2006.01)
*H04N 5/232* (2006.01)
*G09G 5/00* (2006.01)
*G06G 3/033* (2006.01)

(52) U.S. Cl. .................. 348/207.99; 348/211.99; 345/156; 345/163

(58) Field of Classification Search .............. 348/360, 348/148, 36, 143, 272, 207.99, 211.99; 345/156, 345/157, 158, 166, 160, 163, 690, 694, 696, 345/605, 589, 596, 597; 382/189, 190
See application file for complete search history.

(56) References Cited

U.S. PATENT DOCUMENTS

| 5,045,843 | A | | 9/1991 | Hansen |
| 5,138,154 | A | | 8/1992 | Hotelling |
| 5,227,985 | A | | 7/1993 | DeMenthon |
| 5,297,061 | A | | 3/1994 | Dementhon et al. |
| 5,440,326 | A | | 8/1995 | Quinn |
| 5,594,169 | A | | 1/1997 | Field et al. |
| 5,698,784 | A | | 12/1997 | Hotelling et al. |
| 5,825,350 | A | | 10/1998 | Case, Jr. et al. |
| 5,898,421 | A | | 4/1999 | Quinn |
| 6,677,929 | B2 | * | 1/2004 | Gordon et al. .............. 345/156 |
| 6,738,041 | B2 | | 5/2004 | Silber |
| 6,809,723 | B2 | * | 10/2004 | Davis .......................... 345/166 |
| 6,961,045 | B2 | * | 11/2005 | Tsao ........................... 345/103 |
| 7,116,427 | B2 | * | 10/2006 | Baney et al. ................. 356/498 |
| 7,379,049 | B2 | * | 5/2008 | Hengstler et al. ........... 345/158 |
| 2001/0030668 | A1 | | 10/2001 | Erten et al. |
| 2003/0085879 | A1 | * | 5/2003 | Shi ............................. 345/166 |
| 2004/0150734 | A1 | * | 8/2004 | Sobel et al. .................. 348/272 |
| 2005/0275630 | A1 | * | 12/2005 | Butterworth et al. ........ 345/166 |

* cited by examiner

*Primary Examiner*—Lin Ye
*Assistant Examiner*—Marly Camargo
(74) *Attorney, Agent, or Firm*—Carter, DeLuca, Farrell & Schmidt, LLP

(57) ABSTRACT

A system and method is provided for imaging a screen of a display device, including filtering light emitted or reflected from the screen and a background region in proximity to the screen using first and second polarizing angles; sensing the filtered light; and generating at least one image set corresponding to the sensed filtered light. Each image set includes at least one image having a first plurality of pixels corresponding to the sensed filtered light using the first polarizing angle and a second plurality of pixels corresponding to the sensed filtered light using the second polarizing angle.

31 Claims, 9 Drawing Sheets

DEVICE USING A CAMERA AND LIGHT POLARIZATION FOR THE REMOTE DISPLACEMENT OF A CURSOR ON A DISPLAY

This application claims priority under 35 U.S.C. §119(e) to a U.S. Provisional Application filed on Jul. 28, 2004 and assigned U.S. Provisional Application No. 60/591,892, the contents of which are incorporated herein by reference.

BACKGROUND

1. Field of the Disclosure

This disclosure relates to a system and method for remotely controlling a cursor. In particular, this disclosure relates to a system and method using a camera and light polarization for the remote displacement of a cursor on a display.

2. Description of the Related Art

In the earlier menu-based user interfaces for operating a personal computer, control of a position indicator was achieved by operating arrow keys. With progress, personal computers were provided with a pointing device, such as a mouse or touch pad, for controlling the motion of a position indicator on a computer monitor by manipulating the pointing device relative to a base, rather than using arrow keys to control the position indicator. Advantages include speed and the provision of an intuitive graphical user interface (GUI).

User interfaces for display devices, such as televisions, include a menu-based interface. Handheld remote control devices widely used today allow a user to remotely control the motion of a position indicator on a screen of a display device, e.g., a television screen, for moving through menu selections of the menu-based interface. The remote control device is held in a random position, provided that communication is established with a processor provided with the display device. Control of the position indicator is limited to using arrow keys for interacting with a menu-based user interface, e.g., scrolling down a television channel guide, in a way reminiscent of the earlier computer user interfaces.

Other prior art systems and methods have been provided for remotely controlling objects displayed on the screen of the display device by pointing the remote control device at the screen, moving the remote control device in space, and tracking the movement of the remote control device relative to a reference location (such as the position of a specially provided device, such as an LED) or a previous position, rather than using arrow keys. However, the location of the remote control device relative to the screen without a specially provided device may not be determined. Furthermore, in prior art systems that include acquiring an image of the screen with a camera, reliable determination of a region of the image which corresponds to the screen may be foiled by background elements that have characteristics that are similar to the characteristics of the screen.

A need exists for a system and method to determine a location of a remote control device relative to a screen of a display device without providing additional devices and to track movement of the remote control relative to the screen. Additionally, a need exists for reliably determining a region of an image that corresponds to the screen.

SUMMARY

In an embodiment of the present disclosure, a system is provided for imaging a screen of a display device. The system includes a photo sensor array sensing incident light emitted or reflected from the screen and a background region near the screen and generating at least one image set corresponding to the sensing; and at least one polarizing filter including at least first and second polarizing regions for filtering light incident on the photo sensor array, wherein the first and second polarizing regions have first and second polarizing angles, respectively. Each image set of the at least one image set includes at least one image having a first plurality of pixels corresponding to the sensing of incident light filtered by the first polarizing region and a second plurality of pixels corresponding to the sensing of incident light filtered by the second polarizing region.

In another embodiment of the disclosure a method is provided for imaging a screen of a display device. The method includes filtering light emitted or reflected from the screen and a background region in proximity to the screen using first and second polarizing angles; sensing the filtered light; and generating at least one image set corresponding to the sensed filtered light. Each image set includes at least one image having a first plurality of pixels corresponding to the sensed filtered light using the first polarizing angle and a second plurality of pixels corresponding to the sensed filtered light using the second polarizing angle.

In another embodiment of the disclosure a system is provided for remotely controlling a cursor displayed on a graphical user interface (GUI) displayed on a screen of a display device. The system includes a polarizing filter including at least first and second polarizing regions arranged in an arrangement for filtering light, wherein the first and second polarizing regions have first and second polarizing angles, respectively; and a photo sensor array sensing incident light emitted or reflected from the screen and a background region in proximity to the screen, the incident light being filtered by the first and second polarizing regions, the photo sensor array generating at least one image corresponding to the sensed incident light.

The system further includes at least one processor and at least one storage device accessible by the at least one processor and storing a series of programmable instructions executable by the at least one processor. Execution of the programmable instructions includes comparing intensities between first and second pixels of respective pixel pairs of an image of the at least one image, wherein the first pixel corresponds to incident light filtered by the first polarizing region and the second pixel corresponds to incident light filtered by the second polarizing region; determining a location of at least one feature of the screen in the image based on the intensity comparisons for respective images of the at least one image; and tracking movement of the location of the at least one feature in the at least one image.

A communication device is provided for transmitting tracking information indicative of the tracked movement to a processing device associated with the display device for controlling the position of a position indicator provided on a GUI displayed on the screen of the display device in accordance with the tracked movement of the location of the at least one feature.

BRIEF DESCRIPTION OF THE DRAWINGS

Various embodiments of the disclosure will be described herein below with reference to the figures wherein.

DETAILED DESCRIPTION OF THE PREFERRED EMBODIMENTS

Figure 1:
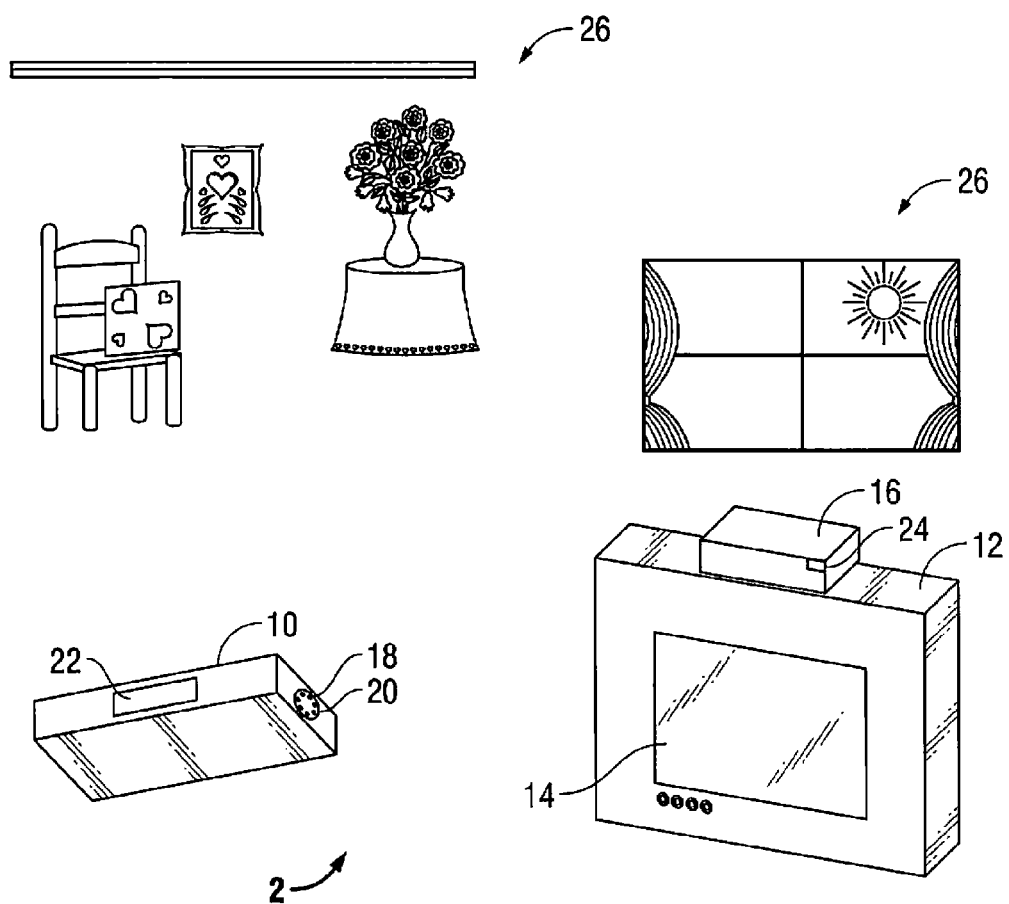
FIG. 1 is a perspective view of a remote control device and a display device in accordance with the present disclosure.
Figure 2:
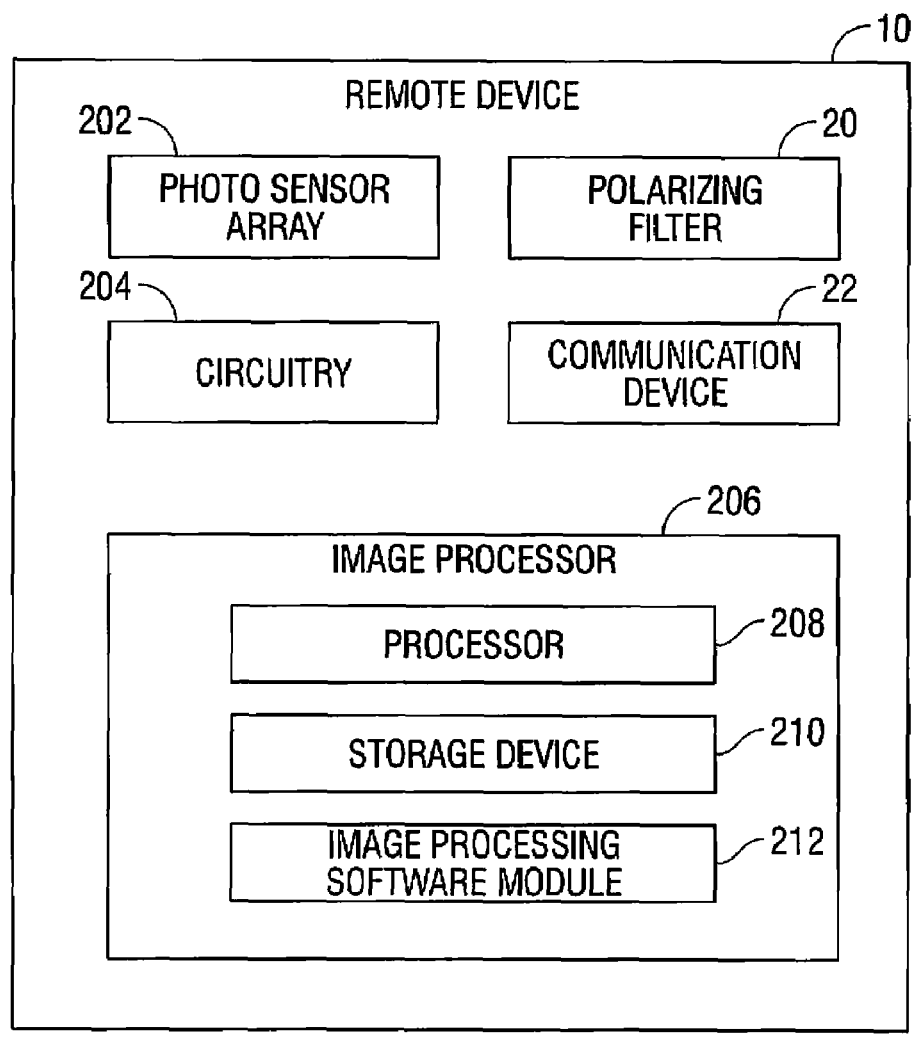
FIG. 2 is a block diagram of the remote control device shown in FIG. 1.

Reference should be made to the drawings where like reference numerals refer to similar elements throughout the various figures. FIGS. 1 and 2 shows a remote control system 2 for manipulating a position indicator, including a remote control device 10 having imaging and image processing capabilities, a display device 12 having a screen 14, and an associated processor assembly 16. The screen 14 has the characteristic of emitting light which is strongly polarized in a single direction. The display device 12 may be positioned near other objects. The objects and space near the display device 12 form a background region 26. The remote control device 10 is provided with at least one window 18 (shown in phantom) through which light emitted by the display device 12 and/or emitted or reflected from the background region 26 passes. Each window 18 is provided with a polarizing filter 20 which polarizes light that enters the window 18 in at least two different directions (e.g., at two different polarizing angles).

The remote control device 10 is preferably a handheld device. Movement of the remote control device 10 by a user in a horizontal or vertical direction causes substantially proportional movement in the horizontal and vertical directions, respectively, of a position indicator of a graphical user interface (GUI) displayed on the screen 14. The remote control system 2 is configured so that aiming and manipulation of the remote control device 10 for moving the position indicator operates in a manner similar to that of aiming and manipulation of a laser pointer for moving a laser spot produced by the laser pointer. The remote control device 10 may be integrated into another device, such as a conventional remote control device for controlling a media device, television, VCR player, DVD player, MP3 player, radio, stereo, personal digital assistant (PDA), cellular telephone, etc. The remote control device 10 may further include a selection actuator, e.g., a button or the equivalent, for selecting an item displayed on the screen 14 that the position indicator is pointing at, where actuation of the selection actuator causes generation and transmission of a selection signal. The remote control device 10 may further be provided with user input keys, e.g., alphanumeric keys or a subset thereof, arrow keys, etc. The remote control device 10 may be provided with functionality equivalent to the functionality of a prior art pointing device, such as a mouse or touch pad.

The remote control device 10 further includes at least one camera for sensing incident light and generating at least one image set. Each respective camera includes a photo sensor array 202, and may further include an objective lens assembly having one or more optical lenses 203 for focusing light which passes through the window 18 and is incident on a front surface of the photo sensor array 202. The photo sensor array 202 senses incident light which passes through the window 18 and filter 20, and generates a sensing signal corresponding to the sensing, where the sensing signal includes an array of image signals that correspond to sensing by the respective sensors of the photo sensor array 202. The photo sensor array 202 may include a charge coupled device (CCD), however, it is to be understood that other area or linear image sensors may be used, such as CMOS, charge modulated device (CMD) and charge injection device (CID) sensors.

The photo sensor array 202 may continually sense light and generate a continual sensing signal or a series of frames of sensing signals. A target area seen by the camera, e.g., the area from which light sensed by the photo sensor array 202 was reflected or emitted is known as a field of view (FOV) of the camera. An image acquired by the camera corresponds to the FOV of the camera. As the remote device 10 is manipulated by a user, the FOV of the camera changes, and the position of the screen 14 within the image acquired. Changes in the position of the screen 14 in the images acquired are substantially proportional to movement of the remote device 10 in the horizontal (X) and vertical (Y) directions. The proportionality may change when the distance between the remote device 10 and the display device 12 changes.

The sensing signal is processed by circuitry 204 for transforming the sensing signal into digital image data for processing by a digital device. Circuitry 204 may include an A/D converter, amplifier, buffer, filter, timing circuitry, etc., or a combination thereof. The digital image data include an array of a plurality of image pixels which correspond to the respective image signals. The circuitry 204 may be included with the photo sensor array 206 or with a processing device that processes the sensing signals. The digital image data are provided as an image to an image processor 206 in a series of frames of images where the series of frames may form a video stream, for processing thereof.

At least a portion of the images generated by the camera are processed by the image processor 206. The image processor 206 includes at least one processor 208, such as a microprocessor, a PC, a handheld computing device, a mobile phone, a mainframe computer, a network of computers, etc. A processors of the at least one processor 208 may be included in one or more networks, such as LAN, WAN, Extranet, the Internet, etc. The processors may communicate via wired and/or wireless communications. The image processor 206 has access to at least one storage device 210, such as RAM, ROM, flash RAM, a hard drive, a computer readable medium, such as a CD-ROM, etc. Additionally, processors of the at least one processor 208 may be integrated or in data communication with the remote control device 10, and/or integrated or in data communication with the processor assembly 16. In one example, where the remote control device 10 is a cellular phone having a CPU, the at least one processor 208 is included in the CPU.

The image processor 206 further includes an image processing software module 212 which is executable on the at least one processor 208 of the image processor 206 for processing the digital image data. The image processing software module 212 includes a series of programmable instructions executable by the at least one processor 208. The series of programmable instructions may be stored on the storage device 210, which is accessible by the at least one processor 208, or transmitted via propagated signals for execution by the at least one processor 208 for performing the functions described herein and to achieve a technical effect in accordance with the disclosure.

Processing of an individual image of the series of frames of images acquired by the image processor 206 includes detecting at least one feature of the screen (e.g., edge, corner, center or a combination thereof) in the image whose location is indicative of the location of the screen 14 in the acquired image. The location of the detected feature of the screen may be described by the coordinates of a set of one or more image pixels which correspond to the detected at least one feature of the screen 14, e.g., the center pixel of the screen.

By tracking movement of the detected at least one feature in a series of images acquired by the camera, the position of the screen 14 in the image and the location of the region of the image corresponding to the screen 14 are determined, and reflect the motion of the remote device 10 relative to the screen 14 for controlling the position of the position indicator on the screen 14. When controlling the position indicator on the screen in accordance with motion of the remote control device 10, upon detecting a change in the position of the detected at least one feature relative to the predetermined pixel of the image, a control signal is generated by the imaging processor.

The control signal may include X and Y displacement values that describe quantitative changes in the location of the detected at least one feature in the X and Y directions, respectively, relative to a previous location. Alternatively, the control signal may include the new location of the detected at least one feature. If the X and Y displacement values are not included in the control signal, they may be determined from the control signal and a previously generated control signal. Accordingly, the X and Y displacement values may be determined by the imaging processor 206, by the processor assembly 16, and/or by the display device 12.

The X and Y displacement values may be processed by the display device 12 in a way that is similar to the processing of signals generated by a prior art pointing device, such as a mouse, joystick or trackball. Such prior art pointing devices generate signals similar or equivalent to the X and Y displacement values which are indicative of manipulation of the prior art pointing device, where the generated signals are used for determining a next position of a position indicator of a GUI for moving the position indicator in proportion to the manipulations of the pointing device.

The remote device 10 is provided with a first communication device 22 having a transmitter or a transceiver for transmitting data to the image processor 206 or the processor assembly 16, where the data may include image data, pixel coordinates, X and Y displacement values and/or selection signals. For a first embodiment of the disclosure in which the image processor 206 is included with the remote device 10, the coordinates of the set of image pixels which correspond to one or more features of the at least one feature, and/or the X and Y displacement values, are transmitted via the first communication device 22 to the processor assembly 16 associated with the display device 12. For a second embodiment of the disclosure in which the image processor 206 is remote from the remote device 10, the image signal is transmitted, e.g., as a video stream, via the first communication device 22 to the image processor 206.

The first communication device 22 may be configured for wired or wireless communication. Accordingly, the first communication device 22 may include a cable, an infrared communication port (IRDA port), a radio frequency communication port, a cellular communication port, a personal communication service (PCS) communication port, etc. The first communication device 22 may use an appropriate protocol for wireless communication, such as Bluetooth™ for low bandwidth transmissions, such as for transmitting data, e.g., pixel coordinates and/or X and Y displacement values. When transmitting video stream data or low bandwidth data, the data may be transmitted via radio waves, in analog National Television Systems Committee (NTSC) or Phase Alternating Line (PAL) format, via cable, or in digital form via a universal serial bus (USB) or FireWire™ cable.

The display device 12 may be a display device for a TV; VCR player; DVD player; computer; automated teller machine (ATM); ticketing device for purchasing tickets, such as movie tickets or airline tickets; meter device, etc. The display device 12 may be provided with user controls, such as knobs and buttons. The screen 14 is formed using a technology or filter which strongly polarizes light emitted therefrom in a single direction. The screen 14 may be for example a liquid crystal display (LCD) screen, or a plasma display screen having a polarizing film, and may be a flat panel screen or have a curvature (e.g., a projection screen).

A GUI displayed on the screen 14 includes selectable graphical elements and the position indicator. The graphical elements may be, for example, icons, a menu, soft buttons, scroll bars, etc., where pointing at (e.g., selecting) a graphical element using the position indicator causes an action to happen. The position indicator may be, for example, a small graphical element, such as an arrow or hand that points at another graphical or textual element. One method of pointing at an element, group of elements or an area displayed on the screen is to use highlighting.

In accordance with the present disclosure, when the remote control device 10 is moved by translation or by a change of orientation in a horizontal and/or vertical direction relative to the stationary screen 14, the position indicator is repositioned in the GUI substantially proportionally in the X and Y directions, respectively. The proportionality may change if the distance between the remote device 10 and the display device 12 changes. The user may manipulate the remote control device 10 for positioning the position indicator to point at a desired graphical element displayed on the screen 14, for example, a graphical element representing a desired digital versatile disc (DVD) chapter.

The processor assembly 16 includes at least one processor, such as a set top box, a microprocessor, a PC, a network of computers, etc. A processor of the at least one processor may be included in one or more networks, such as LAN, WAN, Extranet, the Internet, etc. The networked processors may communicate via wired and/or wireless communication. The processor assembly 16 includes or has access to at least one storage device, such as RAM, ROM, flash RAM, hard drive, memory card, computer readable medium, such as a CD-ROM, etc. The processor assembly 16 may be integrated with the display device 12 or separate and in operative communication with the display device 12.

The position indicator of the GUI is controlled by the processor assembly 16. For example, as shown by FIG. 1, the display device 12 may be a television having a processor, and the processor assembly 16 may be a set top box in communication with the processor of the television for generating the GUI displayed on the television. Alternatively, the processor of the television may generate the GUI, and the set top box may send commands to the processor of the television for controlling the position indicator of the GUI.

In another example, the display device 12 may be a computer having a processor which generates the GUI, and the processor assembly 16 may be the processor of the computer. Similar to the operation of a prior art pointing device, such as a mouse, trackball or joystick, when the processor assembly 16 receives or processes the X and Y displacement values, it generates commands to move the position indicator displayed on the screen 14 from its current position to a new position by an amount in each of the X and Y directions that is substantially proportional to the X and Y displacement values, respectively.

The processor assembly 16 is provided with a second communication device 24 for receiving information from the first communication device 22 of the remote control device 10 and/or the image processor 206. The second communication device 24 may be configured for wired or wireless communication. Accordingly, the second communication device 24 may include a cable, an infrared communication port (IRDA port), a radio frequency communication port, a cellular communication port, a personal communication service (PCS) communication port, etc.

The second communication device 24 may use an appropriate protocol for wireless communication, such as Bluetooth™ for low bandwidth transmissions, e.g., for receiving data such as the pixel coordinates and/or the X and Y displacement values. When receiving video stream data or low bandwidth data, the data may be received via radio waves, in analog National Television Systems Committee (NTSC) or Phase Alternating Line (PAL) format via cable, or in digital form via a universal serial bus (USB) or FireWire™ cable.

The remote control device 10 is provided with a polarizing filter 20 to selectively filter light coming from the screen 14. The filter 20 may be disposed exterior or interior of the window 18 for filtering light before or after it passes through the window 18. In a preferred embodiment of the disclosure, the filter 20 is disposed directly in front of, and more preferably, directly on the front surface of the photo sensor array 202. In photo sensor arrays of prior art imaging devices, the photo sensor array may be covered with a glass plate. In accordance with the present disclosure, the photo sensor array 202 may be covered by a glass plate which has polarizing properties. A glass plate having polarizing properties may be manufactured, for example, by deposition of liquid crystals on the glass plate. The filter 20 is sized to accommodate the photo sensor array 202.

By placing the filter 20 directly in front of the photo sensor array 202, when the filter 20 includes a plurality of first regions having a first polarization angle and a plurality of second regions having a second polarization angle, a boundary formed between adjacent first and second regions will be sharper in acquired images, than if the filter 20 were disposed further away from the front surface of the photo sensor array 202. As described further below, pixels corresponding to the boundaries are of particular interest during image processing.

Robust detection of the at least one feature of the screen 14 is enhanced by filtering the light, sensing the filtered light for acquiring the image and processing the image in accordance with the present disclosure. By filtering the light before acquiring the image, the at least one feature of the screen 14 can be detected and distinguished from objects in the background region 26. In accordance with the system and method of the present disclosure (as described below), the at least one feature of the screen 14 is distinguishable from the objects in the background region, even when the objects are objects that could potentially be mistaken for a screen, such as a rectangular window, framed picture or framed mirror that reflects light, including even when the reflected light is brighter than the light emitted from the screen 14.

With respect to FIGS. 3A-3D, a first embodiment of the disclosure is shown in which at least first and second filters 20A and 20B, respectively, are provided. Light passing through the first and second filters 20A and 20B is associated with first and second sets of digital image data, respectively. The first and second filters 20A and 20B polarize light in first and second directions, respectively. Preferably, the first and second directions are perpendicular to one another.

Figure 3A:
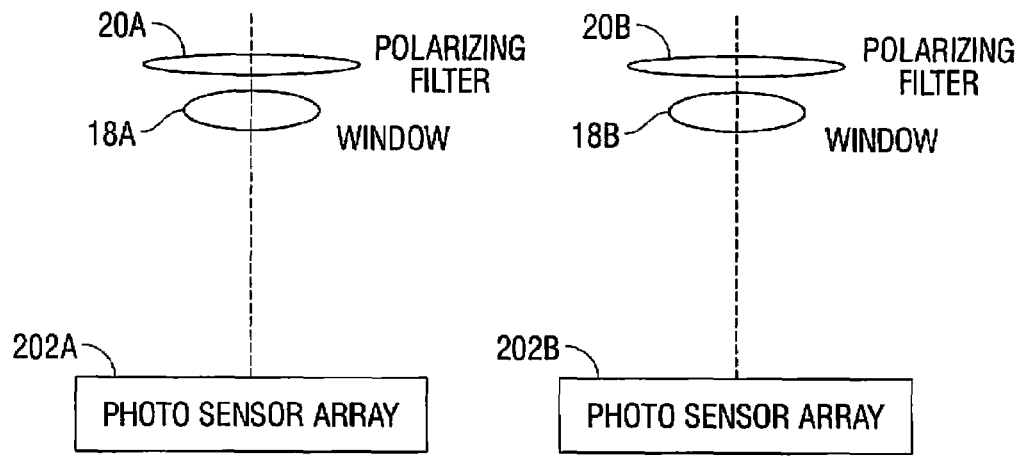
FIGS. 3A-D show configurations of a first embodiment of a filter of the remote control device shown in FIG. 1.

In a first configuration of the disclosure shown in FIG. 3A, the first and second filters 20A and 20B, respectively, filter light passing through first and second windows 18A and 18B, respectively. First and second photo sensor arrays 202A and 202B, respectively, are provided for sensing light passing through the first and second windows 18A and 18B, respectively. The light paths are indicated by the dotted lines. The first and second photo sensor arrays 202A and 202B generate first and second sensing signals, respectively, which are converted into the first and second digital images, respectively. The first and second digital images form an image set. The at least one image set may be acquired by consecutively acquiring individual image sets.

Figure 3B:
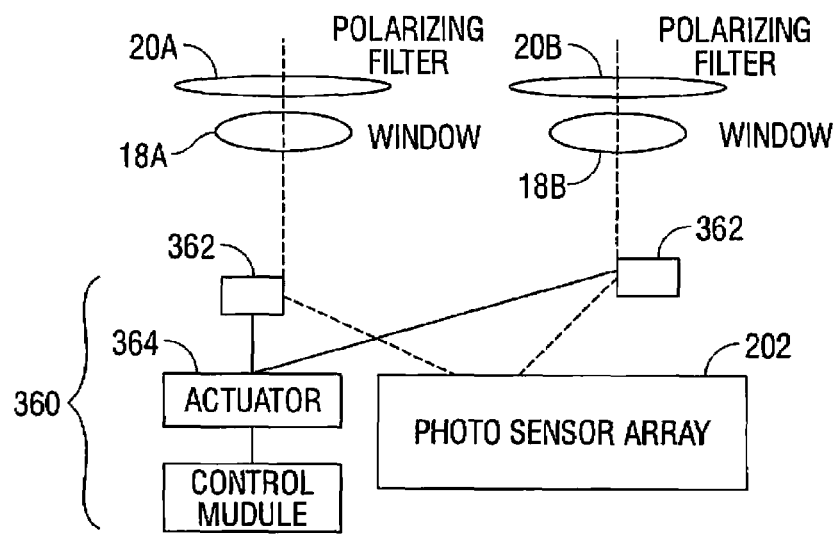

In another configuration shown in FIG. 3B, only one photo sensor array 202 is provided, and the light passing through at least one of the first and second windows 18A and 18B is deflected by a deflection mechanism 360, including at least one deflection device 362, such as a mirror, at least one actuator 364 and a control module 366 for controlling the at least one actuator 364. The deflection mechanism 360 deflects light so that the light incident on the photo sensor array 202 alternates between the light passing through the first window 18A and the second window 18B for acquiring an image set including consecutively acquiring a first image using the first filter 20A and a second image using the second filter 20B. The at least one deflection device 362 is adjustable, such as by actuation of a motor 364 as controlled by a control module 366 for alternating between deflecting light passing through the first filter 20A and then the second filter 20B such that the deflected light is consecutively incident on the photo sensor array 202.

Figure 3C:
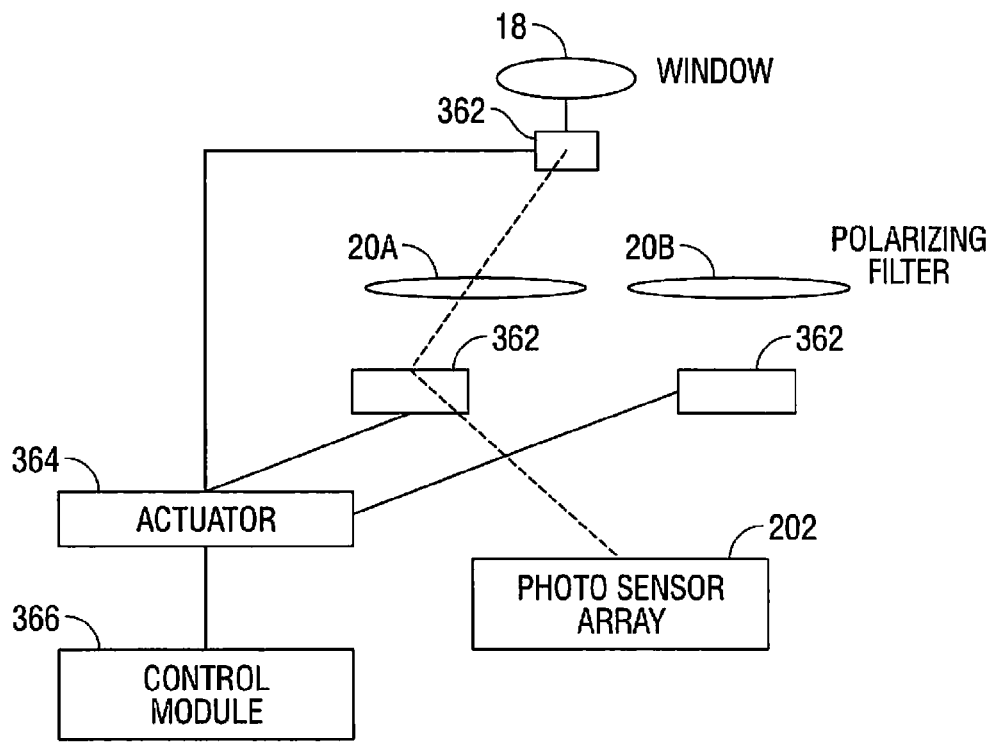

In another configuration of the first embodiment shown in FIG. 3C, one window 18, two filters 20A and 20B, and one photo sensor array 202 are provided. Consecutive first and second images are acquired using the first and second filters 20A and 20B, respectively, corresponding to the first and second sets of digital image data, respectively. A first deflection device 362 is provided for deflecting light passing through window 18 to pass through the first filter 20A, and then to pass through the second filter 20B. In FIG. 3C, the light is shown passing through the first filter 20A. A second deflection device 362 is provided for deflecting light passing through the filter to be incident on the photo sensor array 202. Accordingly, the light incident on the photo sensor array 202 alternates between the light passing through the first filter 20A and the second filter 20B for consecutively acquiring first and second images of an image set. Actuation of the at least one first and second deflection devices 362 is provided by at least one actuator 364, which is controlled by control module 366. Alternatively, first and second photo sensor arrays 202 may be provided for sensing light passing through the first and second filters 20A and 20B, respectively, without deflection of the light after passing through the filters.

Figure 3D:
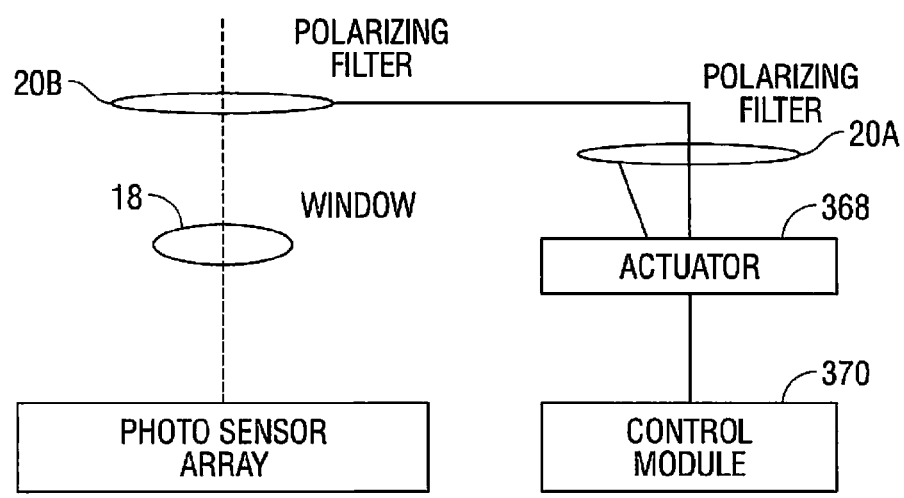

In a configuration shown in FIG. 3D, one window 18 and one photo sensor array 202 is provided. First and second filters 20A and 20B, respectively, are movable in and out of the path of the light passing through the window 18. In FIG. 3D, the light is shown passing through the first filter 20A. Actuation of an actuator 368 moves the first and second filters 20A and 20B in and out of the path of the light. Actuator 368 is controlled by a control module 370. Accordingly, the light incident on the photo sensor array 202 alternates between the light passing through the first filter 20A and the second filter 20B for consecutively acquiring first and second images of an image set.

The resultant image sets are processed, e.g., by comparing or combining the first and second images of a respective image set. For example, an image difference operation in which the intensity difference between corresponding pixels of at least a portion of the pixels of the first and second images is generated. An intensity difference jump is found for pixels corresponding to the imaged edges of the screen 14. Accordingly, an edge detection algorithm is performed on the results of the image difference operation for detecting the pixels corresponding to the edges of the screen 14. Once a few pixels of each of two perpendicular edges are detected, the intersection of the two edges corresponding to a corner of the screen 14 may be determined in a straight forward manner.

Figure 4:
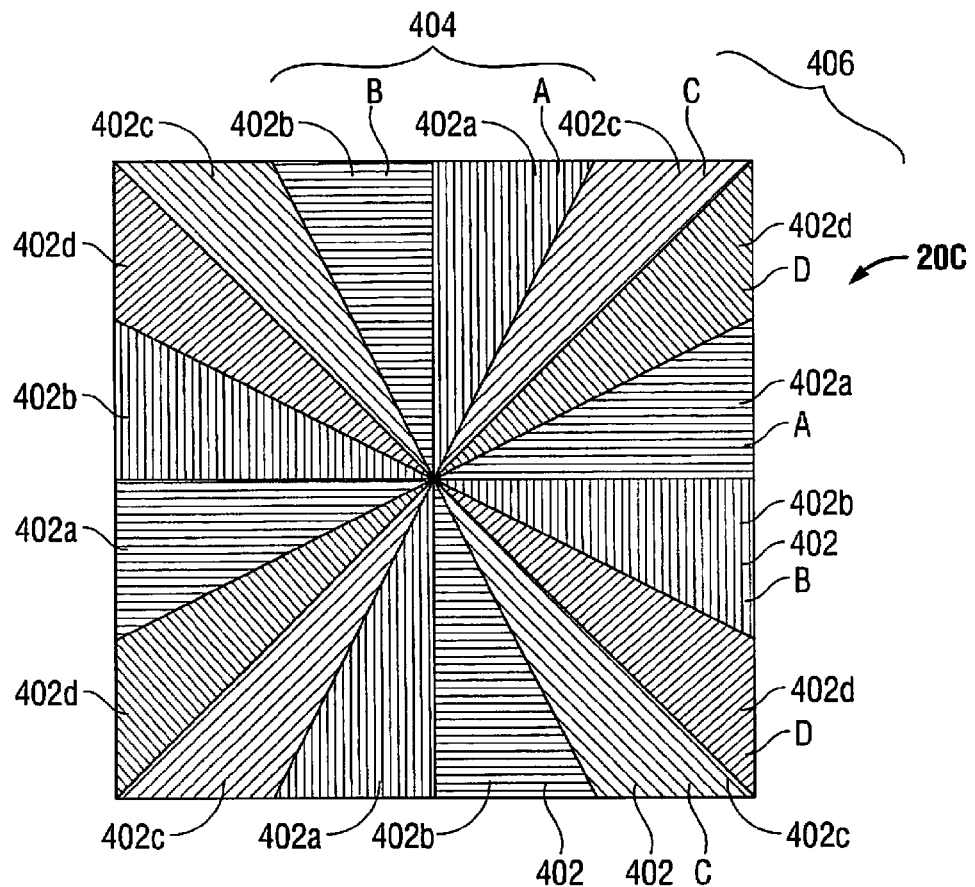
FIGS. 4-6 show different embodiments of the filter of the remote control device shown in FIG. 1.
Figure 5:
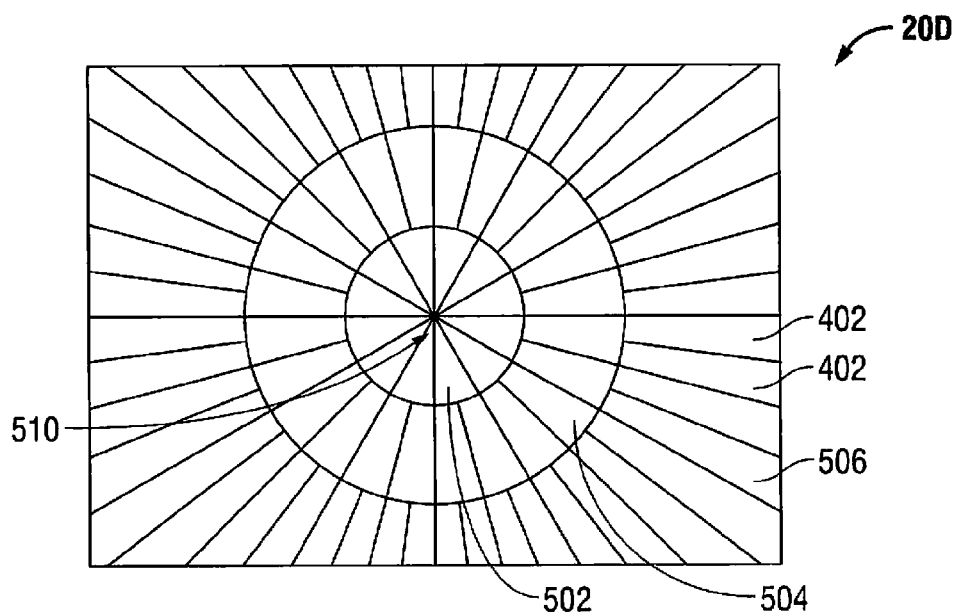
Figure 6:
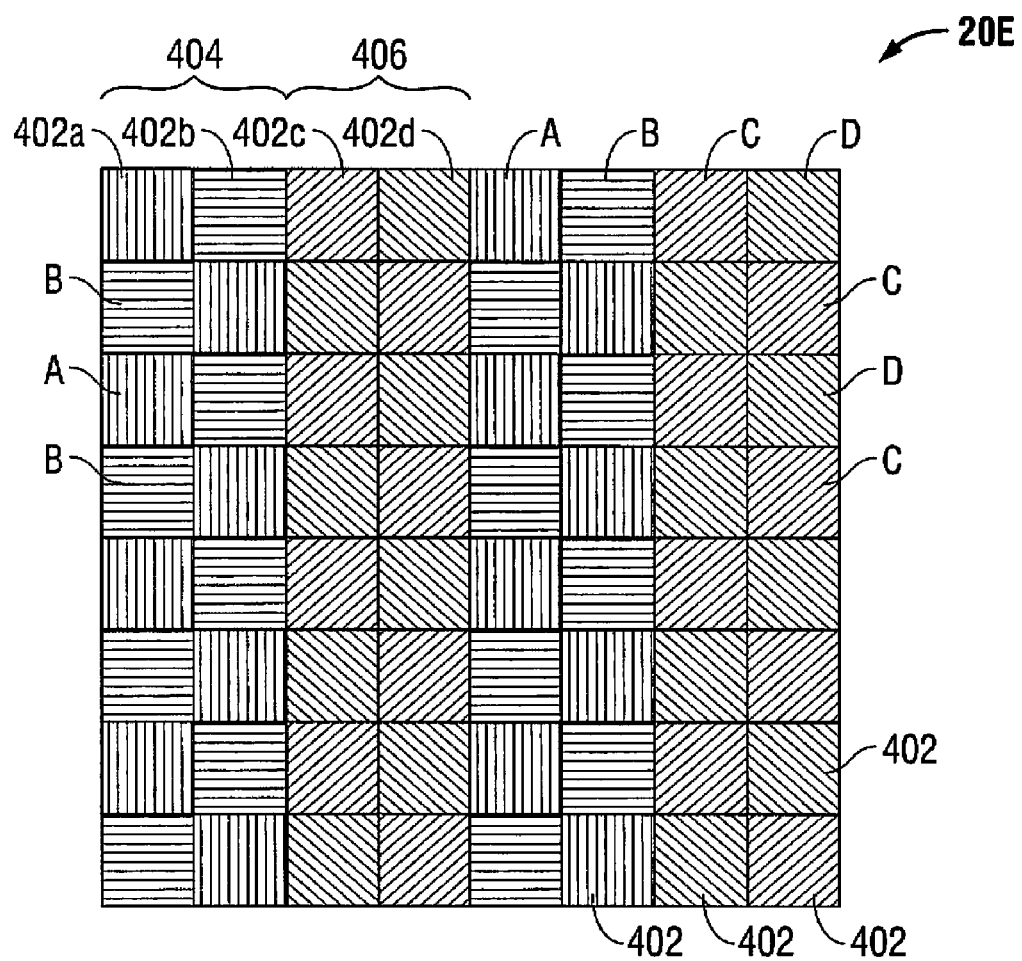

FIGS. 4-6 show exemplary embodiments of the polarizing filter 20, namely filters 20C, 20D and 20E, respectively, each having a plurality of sections 402. For an operation in which an image set having one image is generated, approximately adjacent first and second pixels of the image that correspond to light passing through a section 402 made of the first type of material, respectively, and a section 402 made of the second type of material are compared, e.g., an intensity differential is computed. For approximately adjacent first and second pixels that both correspond to polarized light, i.e., that correspond to the region of an acquired image that corresponds to the screen, the intensity differential is large. For approximately adjacent first and second pixels that both correspond to non-polarized light, i.e., that correspond the region of the acquired image that corresponds to background region 26, the intensity differential is small. A jump in the intensity differential occurs in the regions of the image that corresponds to edges of the screen 14 in the image.

The filters 20C, 20D and 20E each include at least first and second groups of sections 402 which are made of first and second types of filter material, respectively, where the first and second types of material have different polarization angles. The sections 402 are arranged so that the sections 402 of the first group of sections are adjacent to respective sections 402 of the second group of sections, e.g., the sections 402 of the first group of sections alternate with respective sections 402 of the second group of sections. A boundary is formed between adjacent sections 402 of the first and second group, respectively.

During processing of an image, pixel pairs (each having a first and second pixel) of the image which are located alongside boundaries between the first and second groups of sections 402 are processed for determining intensity differentials between the first and second pixels of the respective pixel pairs. The first and second pixels of the respective pixel pairs are located on opposite sides of a respective boundary and are proximate to one another, so that the first and second pixels of the respective pixel pairs are close to the boundary (e.g., adjacent to the boundary or approximately adjacent to the boundary), are neighboring, and in most instances correspond to the same region of the image. Preferably, the first and second pixels of the respective pixel pairs are approximately or nearly adjacent to one another, so that they lie on a line perpendicular to the boundary with the boundary in between the first and second pixel. The nearly adjacent first and second pixels may be as close as possible to each other provided that they are on opposite sides of the boundary. Computing loads are reduced by only computing the intensity differentials for pixel pairs located alongside the boundaries having first and second pixels disposed on opposite sides of the respective boundaries.

A map of the respective determined intensity differentials versus the location of the corresponding pixel pairs may be generated. Intensity differentials that satisfy a condition are detected, where the condition may be, for example, exceeding intensity differentials corresponding to nearby pixel pairs by a predetermined threshold value (e.g., where a jump in the intensity differential relative to neighboring pairs of pixels is detected). The pixel pairs corresponding to the detected intensity differentials that satisfy the condition correspond to points along the edges of the screen 14.

At least one feature of the screen 14 in the image being processed may be determined by using the points along the edges of the screen. For example, the points along the respective edges of the screen are connected for determining the respective edges and for determining points at which respective edges intersect, where the point of an intersection corresponds to a corner of the screen. From the at least one feature of the screen 14 a position of the screen 14 in the image can be determined, the region of the image that corresponds to the screen 14 can be determined and/or the movement of the screen 14 in the image can be tracked. The at least one feature may include a combination of a center point, one or more edges and/or one or more corners of the screen 14. Examples of feature combinations that define the region of the screen include at least three corners, at least three edges in which the length of the edges may be unknown, or a combination thereof. The location of a feature of the at least one feature of the screen 14 is determined relative to a fixed location of the image, e.g., a predetermined pixel, such as the center pixel of the image.

Tracking movement of the screen 14 in the image, for tracking movement of the remote device as manipulated by the user, is performed by tracking a change in the location of one or more features of the at least one feature of the screen 14 relative to the fixed location of the image and/or a previous location of the at least one feature. The tracked movements are used to generate control signals for controlling the position of the position indicator on the screen 14. Accordingly, as the remote device 10 is moved by changes of translation of orientation in the horizontal and vertical directions relative to the screen 14, the position of the position indicator is adjusted by an amount substantially proportional to the movement of the remote device 10. In one embodiment of the disclosure, displacement of the remote device 10 along its optical axis is not detected and/or tracked and does not cause movement of the position indicator along the screen 14. In other embodiments of the disclosure, displacement of the remote device 10 is detected and tracked and may be used to manipulate the GUI or element(s) in the GUI.

In an exemplary method of the present disclosure, the position of the position indicator is controlled for always being at a position on the screen 14 whose image is located at a predetermined location in the FOV of the remote device 10, e.g., at the center of the images acquired by the remote device 10. Tracked changes of the position of the detected at least one feature of the screen 14 with respect to the coordinates corresponding to the pixel at the predetermined location of the image are provided to the display device 12 as control signals for manipulating the position indicator. The control signals may include the X and Y displacement values. The control signals are used by the display device 12 to control the position of the position indicator. Other methods for controlling the position of the position indicator using the detected at least one feature of the screen 14 are included in the scope of the present disclosure.

When the position indicator is positioned to hit the edge of the screen 14, its position may be controlled to behave similarly to a position indicator controlled by a computer mouse, wherein the position indicator crawls along the edge of the screen 14. Other methods for controlling the position indicator when the screen 14 is not in an image(s) acquired by the remote device 10 or the screen 14 is not viewed at the center of an image(s) acquired by the remote device 10 are included in the scope of the present disclosure. For example, movement of the remote device 10 may be detected and/or tracked, and the position indicator may be moved along the screen 14 accordingly.

In a preferred embodiment of the disclosure, the difference between the polarization angle of the materials of the first and second groups of sections 402 is 90 degrees for maximizing intensity differences between first and second nearly adjacent pixels corresponding to light that passed through complementary groups of sections made of first and second types of materials, respectively. Preferably, a section 402 made of the first type of material maximally transmits polarized light emitted from the screen 14, and a section 402 made of the second type of material blocks the polarized light emitted from the screen 14.

Computation of the intensity differential between nearly adjacent pixels on opposite sides of a boundary between complementary groups of sections (e.g., the first and second groups of sections or the third and fourth groups of sections) may be performed as follows:

Delta I=|I_inc (cos$^2$ (phi_inc−phi_pol1)−cos$^2$ (phi_inc−phi_pol2))|

Wherein:
Delta I is the intensity differential between the nearly adjacent pixels P1 and P2;
I_inc is the incoming light intensity;
phi_inc is the polarization angle of the incoming light emitted from the screen 14 relative to a fixed axis;
phi_pol1 is the polarization angles of the first filter material of the filter with respect to the same fixed axis; and
phi_pol2 is the polarization angles of the second filter material of the filter with respect to the same fixed axis.

The polarization angle of the materials used for the first and second groups of sections 402 may be selected for working optimally with a screen 14 that emits light at a known polarization angle. For example, the remote device 10 may be manufactured by the manufacturer of an LCD TV, and sold with the TV. However, for applications in which it is not known what the polarization angle of emitted light will be from screen 14, there is the possibility that the difference between the polarization angle of the incoming light emitted from the screen 14 and the respective polarization angles of the materials of the first and second groups of sections 402 is 45 degrees, which could interfere with the detection of the at least one feature of the screen 14.

One solution is to provide a third and fourth group of sections 402, where nearly adjacent pixels on opposite sides of the boundaries between adjacent sections 402 of the third and fourth group of sections 402 would have a maximum intensity difference. Accordingly, the difference between the polarization angles of the material of the third and fourth groups is 90 degrees and the difference between the polarization angles of the material of the first and third groups and of the material of the second and fourth group of sections 402 is 45 degrees.

Since the intensity differentials are computed for pixels positioned along the area of the image that corresponds to the boundaries between complementary groups of sections 402, more pixels corresponding to the edges of the screen 14 can be detected by providing more boundaries which are more closely spaced to one another. Furthermore, for each boundary, when the boundary is perpendicular to the screen edge, a higher accuracy in the position of a screen edge is obtained than when the boundary is parallel or nearly parallel to the screen edge.

Each filter 20C, 20D and 20E is shown having a first group A of sections 402a and a second group B of sections 402b, where each section 402a from group A is adjacent to a section 402b from group B, and vice versa. In a preferred embodiment of the disclosure, the difference between the polarization angles of the sections 402a of group A and the polarization angles of sections 402b of group B is 90 degrees. Filter 20a further includes a third group C of sections 402c and a fourth group D of sections 402d. The polarization of sections 402c of group C are different from the polarization angles of the sections 402a and 402b of groups A and B, and the difference between the polarization angle of sections 402d of group D and the polarization angle of sections 402c of group C is 90 degrees.

Groups A and B form a first pair of complementary groups 404, and groups C and D form a second pair of complementary groups 406. It is preferable that the difference between the polarization angle of sections 402c of group C and the polarization angle of sections 402a of Group A is 45 degrees. It follows that when the polarizations angles of the sections 402a of group A and sections 402b of Group B are orthogonal, and the polarizations angles of the sections 402c of group C and sections 402d of Group D are orthogonal, the difference between the polarization angle of any section from the first pair of complementary groups 404 and the polarization angle of any sections from the second pair of complementary groups 406 is always 45 degrees.

In the example shown in FIG. 4, the sections 402 of filter 20C are provided as sectors emanating from the center of the filter. The respective boundaries between the sector shaped sections 402 cut the screen edges at an angle that is close to a right angle.

In the example shown in FIG. 5, filter 20D is shown, with concentric areas 502, 504 and 506 having alternating sectors 402, where adjacent sectors 402 in each of the concentric areas 502, 504 and 506 are made of respective materials having different polarization angles. The polarization angles are not shown. Since the width of the sectors in area 502 increases at positions further from the center 510 of the filter 20D, area 504 is provided so that the distance between boundaries between sectors 402 of area 502 does not become very large, without causing an overcrowding of boundaries near the center 510 for minimizing computation. Similarly, area 506 is provided so that the distance between boundaries between sectors 402 of area 504 does not become very large without causing an overcrowding of boundaries near the center 510.

In FIG. 6, another embodiment of filter 20E is shown, in which the sections 402 are arranged in a checkerboard arrangement. The first and second pairs of complementary groups 404 and 406 are shown arranged as alternating columns, however the present disclosure is not limited to the arrangement shown. In another arrangement, the groups may be arranged in rows and columns as follows:

```
A B C D A B C D
B A D C B A D C
C D B A C D B A
D C A B D C A B
A B C D A B C D
B A D C B A D C
C D B A C D B A
D C A B D C A B
```

In another exemplary arrangement, the filter 20E may include only the first pair of complementary groups 404 arranged as a series of columns. The configuration of filter 20E may lead to simpler calculations during the image processing relative to the configurations of filters 20C and 20D. Also, filter 20E may be easier and less expensive to manufacture than other configurations.

Since the effectiveness in blocking and transmitting incoming light by complementary groups of sectors is dependent on the orientation of the filtering material with respect to the screen 14, the remote control device 10 is configured so that when the remote control device 10 is held by a user in a natural position the filter 20 is oriented for maximizing the blocking and transmitting of incoming light. For example, user input keys on the remote control device 10 are disposed in a position that allows the user to visualize and operate the user input keys while keeping the remote control device 10 oriented in an efficient orientation for adequate blocking and transmitting of incoming light.

Figure 7:
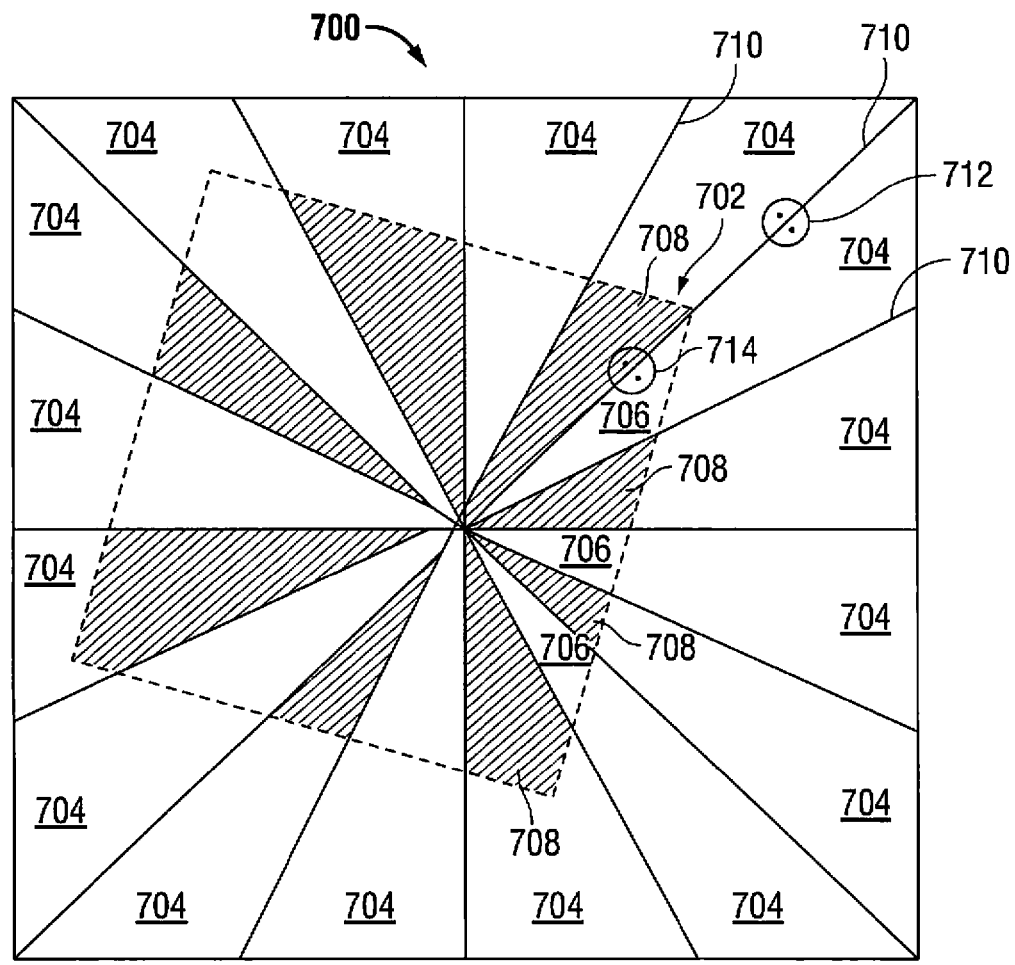
FIG. 7 shows an image acquired in accordance with the present disclosure.
Figure 8:
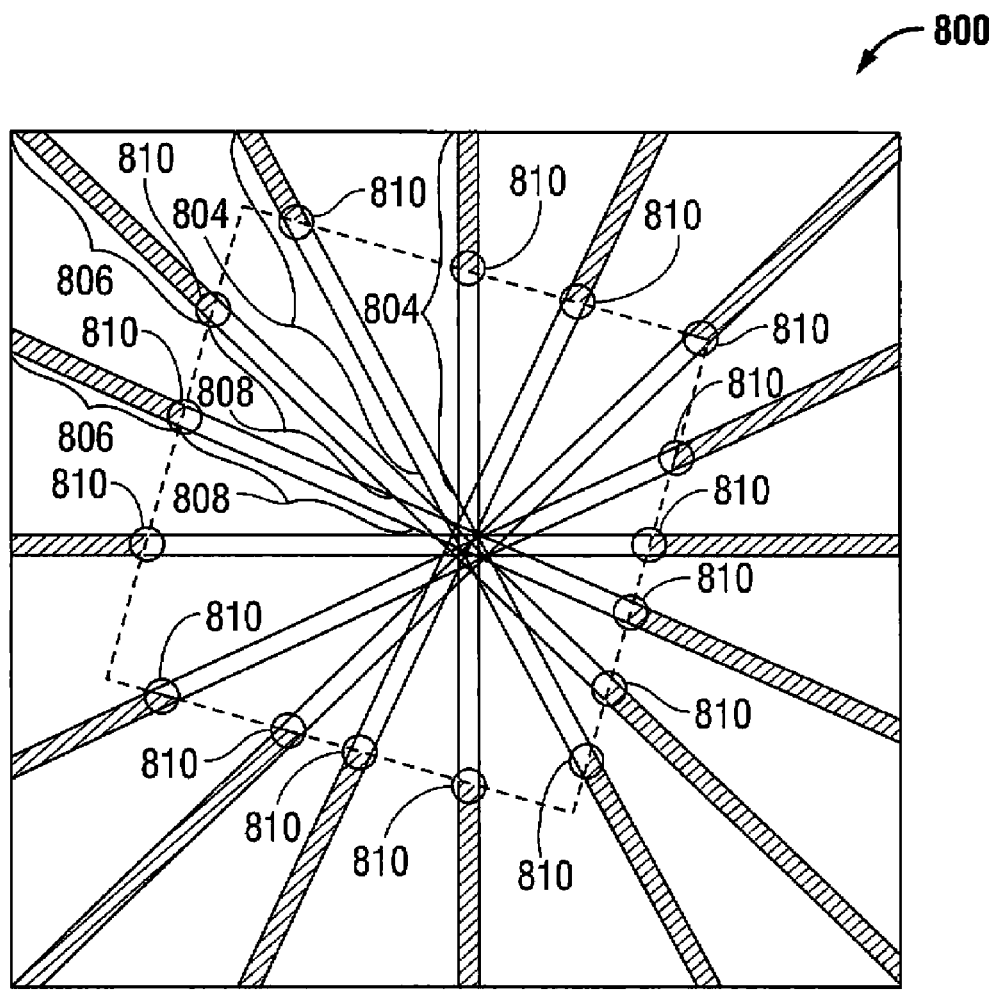
FIG. 8 shows a mapping of intensity differentials for selected pixel pairs of the image shown in FIG. 7.

With reference to FIGS. 7 and 8, FIG. 7 shows an image 700 acquired using a filter 20 similar to filter 20C shown in FIG. 4, but different from filter 20C by having only a first and second group of sections 402a and 402b, respectively, arranged so that the sections of the first and second groups of sections 402a and 402b are alternating. An area 702 bounded by a dotted line that corresponds to the screen is shown, although the dotted line is not included in the image 700. Areas 704 correspond to non-polarized light sensed by the photo sensor array 202 that corresponds to the background region 26. Areas 706 correspond to sensed polarized light that was filtered by the first group of sections 402a using the first polarization angle, and areas 708 correspond to sensed polarized light that was filtered by the second group of sections 402b using the second polarization angle.

The shading (intensity level of the pixels) of areas 706 is lighter than the shading of areas 708 since the first group of sections 402a allowed light to pass at a higher degree than the second group of sections 402b. The shading of areas 704 is relatively light, since the non-polarized light was minimally filtered by first and second groups of sections 402b. Lines 710 designate pixels that correspond to the boundaries between the sections of the first and second groups of sections 402a and 402b, respectively. The lines 710 are not shown in the image, but are shown in the figure for illustration only.

Outside of area 702, the intensity level of the pixels of areas 704 is substantially the same on either side of lines 710 that correspond to the boundaries. A first exemplary pixel pair 712 is shown, where the first pixel pair 712 includes first and second pixels that are nearly adjacent to one another, and lie on opposite sides of line 710. Both pixels of the first pixel pair 712 lie in area 704. The intensity differential between the first and second pixels of the first pixel pair 712 is substantially zero. Inside of area 702 the difference in the intensity level of the pixels on opposite sides of each boundary is relatively large. A second exemplary pixel pair 714 is shown, where the second pixel pair 714 includes first and second pixels that are nearly adjacent to one another, and lie on opposite sides of line 710. The first pixel of the second pixel pair 714 lies in area 706 and the second pixel of the second pixel pair 714 lies in area 708. The intensity differential between the first and second pixel of the second pixel pair 714 is relatively large.

FIG. 8 shows a mapping 800 of intensity differentials computed for pixel pairs of the image 700. Dotted line 802 shows the area of mapping 800 that corresponds to the screen 14. The computations were performed for pixels located along or adjacent to lines 710. Areas 804 show the pixels for which computations were performed. The size of areas 804 is selectable in accordance with design choice. The width of area 804 may be small enough to include only approximately adjacent first and second pixels of a pixel pair that are located on opposite sides of line 710.

Intensity differential computations for portions of area 804 that lie outside of area 802 are relatively low, and are shown as hashed areas 806. Intensity differential computations for portions of area 804 that lie inside of area 802 are relatively high, and are shown as non-hashed areas 808. The mapping is shown graphically, but may be stored in a variety of ways, such as by storing an intensity value differential associated with respective pixel pairs lying within respective areas 804. An algorithm is performed for detecting the pixels within areas 804 that correspond to a jump in intensity differential. The locations in respective areas 804 where a jump in intensity differential is detected is designated by circled areas 810. The locations of the pixels corresponding to areas 810 are used to determine the location of region 802.

Figure 9:
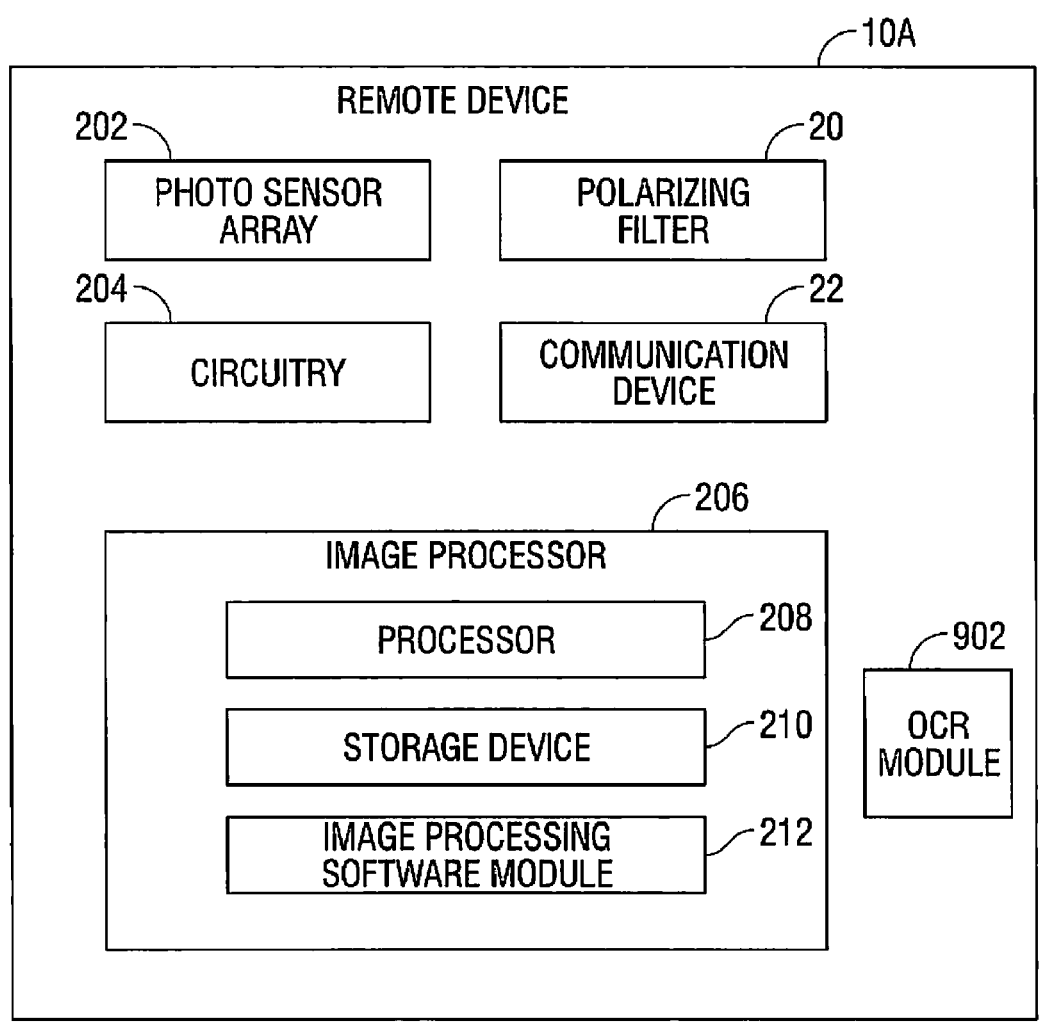
FIG. 9 is a block diagram of another embodiment of the remote control device shown in FIG. 1.

FIG. 9 shows remote control device 10A, which is another embodiment of the remote control device 10. Remote control device 10A includes a window 18, camera (including the photo sensor array 202 and optics), polarization filter 20, image processor 206, where the image processor 206 includes the at least one processing device 208, the at least one storage device 210, the image processing module 212, and an optical character recognition (OCR) software module 902. The OCR module 902 includes a series of programmable instructions that are executable on the at least one processing device 208. The series of programmable instructions may be stored on the storage device 210 which is accessible by the at least one processor 208, or transmitted via propagated signals for execution by the at least one processor 208 for performing the functions described herein and to achieve a technical effect in accordance with the disclosure. The OCR module 902 performs OCR processing on characters that are displayed on the screen 14 and imaged by the remote control device 10A.

The display device 12 displays recognizable characters, such as alphanumeric characters. For example, the display device 12 may be an automated teller machine (ATM), a ticket (movie, airline, train, etc.) distributor, a checkout center or a computer monitor. The camera senses incident light and generates image data corresponding to an FOV of the remote control device 902. When the screen 14 is imaged by the camera, the image processor 206 determines which pixels of the image data correspond to the screen 14 upon which characters to be recognized are displayed. The OCR module 902 processes the image data corresponding to the screen 14 for recognizing characters and generating digital representations of the recognized characters.

Preferably, once the at least one feature of the screen is detected, the orientation of the screen is determined from which the orientation of the characters may be determined, greatly simplifying the processing for recognizing the characters. Furthermore, since the location of the screen 14 is robustly and reliably detected in the image data, the OCR module 902 does not need to attempt character recognition unless a screen is detected and may only attempt to perform character recognition in the region of the image data that corresponds to the screen 14. Accordingly, the OCR module 902 will not attempt to recognize characters in regions of the image data that are not of interest and do not correspond to the screen 14, such as a logo above the screen, a keypad near the screen, etc.

The remote control device 10A may further include the first communication device 22 for communicating with a remote processing device. In a remote embodiment of remote control device 10A, at least a portion of the at least one processor 208, the at least one storage device 210 the image processor 206, the OCR module 902, or a combination thereof may be included with the processing device. For example, a frame or video stream of image data may be transmitted to the remote processing device for further processing thereof. A company providing the display device 12 may also provide the remote processing device including the image processor 206 and/or the OCR module 902. The analog image signals, image data and/or detected features of the screen 14 may be provided by the remote control device 10A to the remote processing device. The remote processing device may process the received data and return results, such as the digital representations of the recognized characters, to the remote control device 10A.

In operation, the remote control device 10A may be a handheld device such as a cellular phone, and the user may be a sight impaired person. The cellular phone or the cellular phone in combination with the remote processing device images a screen of interest, such as an ATM screen, and generates a digital representation of characters displayed on the screen. The digital representation may be presented to the user in a non-visual format, such as via headphones as audio data.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

The invention claimed is:

1. A system for imaging a device having a screen which emits a polarized light, the system comprising:
   a photo sensor array for imaging the polarized light emitting screen including sensing incident polarized light emitted from the screen and incident light reflected from a background region near the screen and generating an image set corresponding to the sensing;
   at least one polarizing filter including at least first and second polarizing regions for filtering light incident on the photo sensor array, wherein the first and second polarizing regions have first and second polarizing angles, respectively, wherein the image set includes at least one image having a first plurality of pixels corresponding to the sensing of incident light filtered by the first polarizing region and a second plurality of pixels corresponding to the sensing of incident light filtered by the second polarizing region; and
   at least one processor for executing a series of programmable instructions which provide for determining a location of the imaged screen in the imaged set by comparing the first and second plurality of pixels.

2. The system according to claim 1, wherein determining the location comprises:
   computing intensity differentials between first and second pixels of respective pixel pairs of the image set, wherein for each pixel pair the first pixel is included in the first plurality of pixels and the second pixel is included in the second plurality of pixels:
   comparing the intensity differentials of the respective pixel pairs of the image set; and
   associating pixel pairs having a relative high intensity differential with at least one imaged feature of the imaged screen for determining the location of the imaged feature in the image set.

3. The system according to claim 2, wherein the polarized light emitted by the screen is strongly polarized in a single direction relative to incidental light reflected from the background region.

4. The system according to claim 2, wherein the at least one imaged feature includes at least a portion of at least one edge of the imaged screen.

5. The system according to claim 2, wherein the series of programmable instructions further provides for determining a region of the processed image set that corresponds to the imaged screen in accordance with the determined location of the at least one imaged feature of the imaged screen.

6. The system according to claim 5, wherein the series of programmable instructions further provides for:
   recognizing characters in the determined region of the processed image set that corresponds to the imaged screen; and
   generating corresponding digital representations of the recognized characters.

7. The system according to claim 2, wherein the series of programmable instructions further provides for tracking movement of the at least one imaged feature in the image set; and
   further comprising a communication device for providing tracking information indicative of the tracked movement to a processing device associated with the display device for controlling the position of a position indicator provided on a graphical user interface (GUI) displayed on the screen of the display device in accordance with the tracked movement of the at least one detested imaged feature.

8. The system according to claim 1, wherein:
   the image set includes first and second consecutively acquired images, wherein the first acquired image includes the first plurality of pixels and the second acquired image includes the second plurality of pixels; and
   the at least one filter includes a first filter including the first polarizing region and a second filter including the second polarizing region.

9. The system according to claim 1, wherein:
   the image set includes a single image; and
   the at least one filter includes a single filter, with the first and second polarizing regions arranged in a pattern on the single filter.

10. The system according to claim 2, wherein: the at least one filter includes a single filter, with the at least first and second polarizing regions arranged in a pattern on the single filter, the pattern including a plurality of boundaries between the first and second polarizing regions;
   the image set includes a single image; and
   intensity differentials are computed for pixel pairs in which the first and second pixels of the respective pixel pairs are proximate to one another, lie on opposite sides of a theoretical boundary in the image which corresponds to a boundary of the plurality of boundaries included in the pattern, and lie near the theoretical boundary.

11. The system according to claim 10, wherein the proximate first and second pixels are nearly adjacent to one another, and intensity differentials are computed only for the pixel pairs in which the first and second pixels of the respective pairs are nearly adjacent to one another and lie on opposite sides of the theoretical boundary.

12. The system according to claim 1, wherein the difference between the first and second polarizing angles is 90 degrees.

13. The system according to claim 10, wherein the single filter further comprises third and fourth polarizing regions having third and fourth polarization angles, wherein the pattern on the single filter includes a plurality of boundaries between the third and fourth polarizing regions.

14. The system according to claim 13, wherein the difference between the third and fourth polarizing angles is 90 degrees.

15. The system according to claim 13, wherein the difference between the first and third polarizing angles is 45 degrees.

16. The system according to claim 10, wherein the pattern includes a plurality of sectors, with respective adjacent sectors of the plurality of sectors corresponding to different regions of the at least first and second polarizing regions.

17. The system according to claim 16, wherein the plurality of sectors are arranged concentrically.

18. The system according to claim 10, wherein the pattern includes a checkerboard arrangement of a plurality of shapes, with respective adjacent shapes corresponding to different regions of the at least first and second polarizing regions.

19. A method for imaging a device having a screen which emits a polarized light, the method comprising the steps of:
    filtering light emitted from the screen and incident light reflected from a background region in proximity to the screen using first and second polarizing angles;
    sensing the filtered light;
    generating an image set corresponding to the sensed filtered light, the image set including a first plurality of pixels corresponding to the sensed filtered light using the first polarizing angle and a second plurality of pixels corresponding to the sensed filtered light using the second polarizing angle; and
    determining a location of the imaged screen in the at least one image set by comparing the first and second plurality of pixels.

20. The method according to claim 19, wherein the determining comprises:
    computing intensity differentials between first and second pixels of respective pixel pairs of the image set, wherein for each pair of pixels the first pixel is included in the first plurality of pixels and the second pixel is included in the second plurality of pixels;
    comparing the intensity differentials of the respective pixel pairs of the image set; and
    associating pixel pairs having a relative high intensity differential with at least one imaged feature of the imaged screen for determining the location of the imaged feature in the image set.

21. The method according to claim 20, wherein the polarized light emitted by the screen is strongly polarized in a single direction relative to incidental light reflected from the background region.

22. The method according to claim 20, wherein the at least one imaged feature includes at least a portion of at least one edge of the imaged screen.

23. The method according to claim 20, further comprising the step of determining a region of the processed image set that corresponds to the imaged screen in accordance with the determined location of the at least one imaged feature of the imaged screen.

24. The method according to claim 23, further comprising the steps of:
    recognizing characters in the determined region of the image set that corresponds to the imaged screen; and
    generating corresponding digital representations of the recognized characters.

25. The method according to claim 21, further comprising the steps of:
    tracking movement of the at least one imaged feature in the image set; and
    transmitting tracking information indicative of the tracked movement to a processing device associated with the display device for controlling the position of a position indicator provided on a graphical user interface (GUI) displayed on the screen of the display device in accordance with the tracked movement of the at least one imaged feature.

26. A system for remotely controlling a cursor displayed on a graphical user interface (GUI) displayed on a screen of a display device, wherein the screen emits a polarized light, said system comprising:
    a polarizing filter including at least first and second polarizing regions arranged in an arrangement for filtering light, wherein the first and second polarizing regions have first and second polarizing angles, respectively;
    a photo sensor array for imaging the polarized light emitting screen including sensing incident light emitted from the screen and incident light reflected from a background region in proximity to the screen, said incident light being filtered by the first and second polarizing regions, said photo sensor array generating at least one image corresponding to the sensed filtered incident light;
    at least one processor for executing a series of programmable instructions which provide for:
    comparing intensities between first and second pixels of respective pixel pairs of an image of the at least one image, wherein the first pixel corresponds to incident light filtered by the first polarizing region and the second pixel corresponds to incident light filtered by the second polarizing region;
    determining a location of at least one imaged feature of the imaged screen in the image based on the intensity comparisons of the respective pixel pairs; and
    tracking movement of the location of the at least one imaged feature in at least two images of the at least one image; and
    a communication device for transmitting tracking information indicative of the tracked movement to a processing device associated with the display device for controlling the position of a position indicator provided on a GUI displayed on the screen of the display device in accordance with the tracked movement of the location of the at least one imaged feature.

27. The system according to claim 26, wherein the comparing step comprises computing a difference between the intensities of the first and second pixels.

28. The system according to claim 27, wherein the determining step comprises:
    determining intensity differentials of the computed intensity differentials that satisfy a condition; and
    detecting a pattern formed by at least a portion of the pixel pairs that correspond to the determined intensity differentials, wherein the pattern corresponds to the at least one feature of the screen in the image.

29. The system according to claim 26, wherein the arrangement includes a plurality of boundaries between the at least first and second polarizing regions, and the first and second pixels of the respective pixel pairs are proximate to one another in the image and are located on opposite sides of a theoretical boundary in the image which corresponds to a boundary of the plurality of boundaries.

30. The system according to claim 29, wherein the proximate first and second pixels of the respective pixel pairs are nearly adjacent to one another.

31. The system according to claim 26, wherein the difference between the first and second polarizing angles is 90 degrees.

* * * * *